United States Patent
Kato et al.

(10) Patent No.: US 11,593,007 B2
(45) Date of Patent: Feb. 28, 2023

(54) MEMORY SYSTEM AND CONTROL METHOD THEREOF

(71) Applicant: Kioxia Corporation, Tokyo (JP)

(72) Inventors: Ryoichi Kato, Yokohama Kanagawa (JP); Hiroyuki Yamaguchi, Kawasaki Kanagawa (JP)

(73) Assignee: KIOXIA CORPORATION, Tokyo (JP)

(*) Notice: Subject to any disclaimer, the term of this patent is extended or adjusted under 35 U.S.C. 154(b) by 329 days.

(21) Appl. No.: 16/372,831

(22) Filed: Apr. 2, 2019

(65) Prior Publication Data

US 2020/0019314 A1 Jan. 16, 2020

(30) Foreign Application Priority Data

Jul. 12, 2018 (JP) .............................. JP2018-132446

(51) Int. Cl.
*G06F 3/06* (2006.01)
*G06F 12/1009* (2016.01)

(52) U.S. Cl.
CPC ............ *G06F 3/064* (2013.01); *G06F 3/0619* (2013.01); *G06F 3/0679* (2013.01); *G06F 12/1009* (2013.01)

(58) Field of Classification Search
CPC ............ G06F 3/064; G06F 2212/1032; G06F 3/0619; G06F 2212/7201; G06F 2212/7203; G06F 12/0246; G06F 12/1009; G06F 2212/7204; G06F 3/0679; G06F 11/1068; G06F 3/061
USPC ................................................. 711/154, 100
See application file for complete search history.

(56) References Cited

U.S. PATENT DOCUMENTS

| | | | |
|---|---|---|---|
| 8,006,030 B2 | 8/2011 | Nakamura et al. | |
| 9,459,881 B2 | 10/2016 | Tuers et al. | |
| 2010/0161881 A1 | 6/2010 | Nagadomi et al. | |
| 2011/0239088 A1* | 9/2011 | Post | G06F 11/1068 714/763 |
| 2014/0258596 A1* | 9/2014 | Kojima | G06F 12/0246 711/103 |
| 2019/0155744 A1* | 5/2019 | Srinivasan | G11C 11/56 |

FOREIGN PATENT DOCUMENTS

JP 4524309 B2 8/2010

* cited by examiner

*Primary Examiner* — Daniel D Tsui
*Assistant Examiner* — Zubair Ahmed
(74) *Attorney, Agent, or Firm* — Foley & Lardner LLP

(57) ABSTRACT

A memory controller specifies, from a nonvolatile memory, a final page candidate, which is a candidate to be the physical page to which data is last written in a logical block. The memory controller executes an upward check process to determine whether the number of programmed physical pages is among a first range number of physical pages in a reverse order from the final page candidate is equal to or greater than a first reference value. The memory controller executes a downward check process determining whether the number of programmed physical pages is among a second range number of physical pages existing in the downward order from the final page candidate is equal to or less than a second reference value, and specifies the physical page to which data is last written in the logical block from results of the upward check process and the downward check process.

20 Claims, 6 Drawing Sheets

US 11,593,007 B2

MEMORY SYSTEM AND CONTROL METHOD THEREOF

CROSS-REFERENCE TO RELATED APPLICATIONS

This application is based upon and claims the benefit of priority from Japanese Patent Application No. 2018-132446, filed on Jul. 12, 2018, the entire contents of which are incorporated herein by reference.

FIELD

Embodiments described herein relate generally to a memory system and a control method thereof.

BACKGROUND

In a memory system using a NAND type flash memory as a storage medium, two searches are used when searching a last written physical page (hereinafter, referred to as a final valid page).

When there is a defective physical page or an erased and damaged physical page (hereinafter, both may be collectively referred to as a non-erased page) on the physical page after the final valid page, the non-erased page may be erroneously determined as a programmed state. Therefore, a maximum value of a time required for a start-up process is large.

Examples of related art include Japanese Patent No. 4524309.

DETAILED DESCRIPTION

Embodiments herein provide a memory system capable of reducing time required for a start-up process and a control method thereof.

In general, according to one embodiment, a memory system includes: a nonvolatile memory; and a memory controller that controls an access of data to the nonvolatile memory. A plurality of physical blocks, which are erasing units of data, exists in the nonvolatile memory, and a plurality of physical pages which are reading/writing units of data exists in the physical block. The memory controller integrates the plurality of physical blocks to constitute a logical block, and integrates physical pages having the same relative position in the physical blocks among the plurality of physical pages to constitute a logical page. The memory controller instructs the nonvolatile memory to write data such that data is arranged in a predetermined first order with respect to the plurality of logical pages, and data is arranged in a predetermined second order with respect to the plurality of physical pages in the logical page. The memory controller specifies, from the nonvolatile memory, a final page candidate which is a candidate of a physical page to which data is last written in the logical block. The memory controller executes an upward check process of determining whether the number of programmed physical pages is equal to or greater than a first reference value among a first range number of physical pages existing in a reverse order to the second order from the final page candidate. The memory controller executes a downward check process of determining whether the number of programmed physical pages is equal to or less than a second reference value among a second range number of physical pages existing in the same order as the second order from the final page candidate. The memory controller specifies the physical page to which data is last written in the logical block from results of the upward check process and the downward check process.

Hereinafter, a memory system and a control method thereof according to embodiments will be described in detail with reference to the accompanying drawings. In addition, the present disclosure is not limited by the embodiments.

Figure 1:
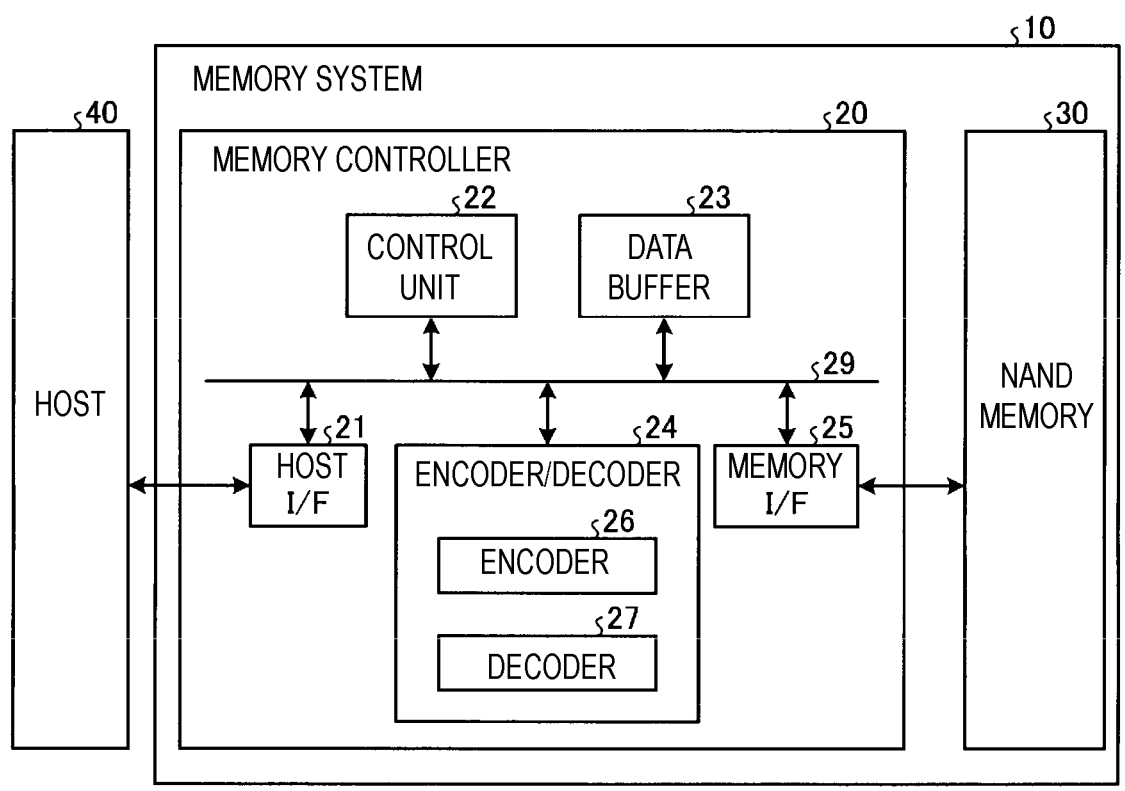
FIG. 1 is a block diagram schematically illustrating an example of a configuration of a memory system according to an embodiment.

FIG. 1 is a block diagram schematically illustrating an example of a configuration of a memory system according to an embodiment. A memory system 10 includes a memory controller 20 and a NAND type flash memory (hereinafter, referred to as a NAND memory) 30 as a nonvolatile memory. The memory system 10 is connectable to a host 40. FIG. 1 illustrates a state where the memory system 10 is connected to the host 40. The host 40 is, for example, an electronic device such as a personal computer or a portable terminal.

The NAND memory 30 is a semiconductor memory capable of holding written data even when power is not supplied. The NAND memory 30 stores, for example, user data transmitted from the host 40 and management information used in, for example, managing storage positions of data in the memory system 10.

The NAND memory 30 is configured with one or more NAND chips each having a memory cell array. The memory cell array is configured so that memory cells are arranged in a matrix form. In each memory cell array, physical blocks that are erasing units (erasers) are arranged. Each physical block has a number of pages that are reading/writing units with respect to the memory cell array.

The memory controller 20 controls the NAND memory 30 to write data based on a write command (write request) from the host 40. Further, the memory controller 20 controls the NAND memory 30 to read data based on a read command (read request) from the host 40. The memory controller 20 includes a host interface (I/F) 21, a control unit 22, a data buffer 23, an encoder/decoder 24, and a memory interface (I/F) 25. The host I/F 21, the control unit 22, the data buffer 23, the encoder/decoder 24, and the memory I/F 25 are connected to each other via an internal bus 29.

The host I/F 21 performs a process according to an interface standard with the host 40, and outputs, for example, the command and the user data received from the host 40 to the internal bus 29. Further, the host I/F 21 transmits, for example, the user data read from the NAND memory 30 and a response from the control unit 22 to the host 40. Further, in the embodiment, data to be written to the NAND memory 30 in response to the write request from the host 40 will be referred to as the user data.

The control unit 22 is a functional unit that collectively controls the respective components of the memory controller 20. When a command (request) is received from the host 40 via the host I/F 21, the control unit 22 controls the respective components of the memory controller 20 based on the command.

Figure 2:
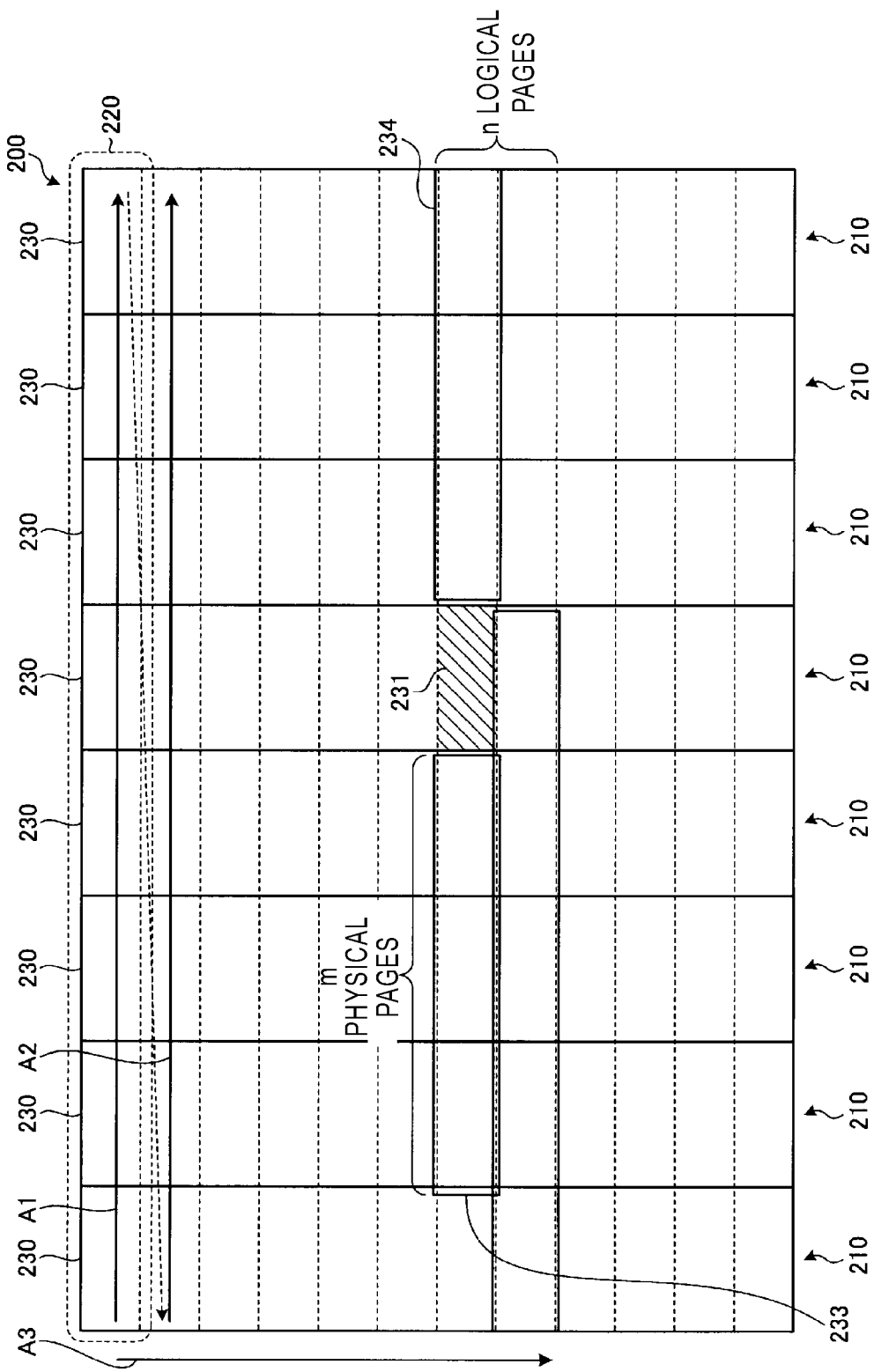
FIG. 2 is a diagram schematically illustrating a relationship between a physical block and a logical block.

The control unit 22 integrates a plurality of physical blocks in the NAND memory 30 to constitute a logical block, and integrates physical pages having the same relative position in the physical blocks among the plurality of physical pages to manage the integrated physical pages as a logical page. FIG. 2 is a diagram schematically illustrating a relationship between a physical block and a logical block. As illustrated in FIG. 2, in the memory system 10, a plurality of physical blocks 210 is integrated to constitute a logical block 200 which is a virtual block. The logical block 200 is used as a management unit of erasing, writing, reading, etc. The respective physical blocks 210 constituting the logical block 200 belong to, for example, different NAND chips. Further, the logical block 200 includes a plurality of logical pages 220. Each logical page 220 is a unit of writing and reading in the logical block 200 and is an integration of physical pages 230 having the same position in the respective physical blocks 210 constituting the logical block 220. As illustrated in FIG. 2, the logical page 220 is the integration of the physical pages 230 having the same relative positions in the respective physical blocks 210 constituting the logical block 200.

For example, the control unit 22 controls the memory I/F 25 based on the command (write command) from the host 40 and instructs the NAND memory 30 to write data. Specifically, the control unit 22 instructs the NAND memory 30 to write data via the memory I/F 25 such that the data is arranged in a predetermined first order with respect to the plurality of logical pages and the data is arranged in a predetermined second order with respect to the plurality of physical pages in the logical page. FIG. 2 illustrates an example of the order of data arrangement in the logical block 200. For example, the data is arranged in order from a relatively earlier address value allocated in the logical block 200. In the example of FIG. 2, the data is arranged in order from left to right in one logical page 220, as indicated by arrows A1 and A2. In addition, in one logical block, as indicated by arrow A3, the data is arranged in order from an upper logical page to a lower logical page.

In this specification, an upward direction from a physical page 231 which becomes a reference in the logical block 200 (hereinafter, referred to as a reference physical page) is referred to as the reverse order to a second order which is a program order. A downward direction from the reference physical page 231 is referred to as the second order.

Further, when m is set to a natural number, the m physical pages in the upward direction from the reference physical page 231 are referred to as the target physical pages 233 of the m physical pages adjacent the reference physical page 231 in the upward direction. In addition, when n is a natural number, the n logical pages in the downward direction from the reference physical page 231 are referred to as the n target logical pages 234 adjacent the reference physical page 231 in the downward direction.

Further, the control unit 22 controls the memory I/F 25 based on the command (write command) from the host 40 and instructs the NAND memory 30 to read data.

When a write request is received from the host 40, the control unit 22 determines a storage area (memory area) on the NAND memory 30 with respect to the user data stored in the data buffer 23. That is, the control unit 22 manages a write destination of the user data. A list of correspondences between a logical address of the user data received from the host 40 and a physical address indicating the storage area on the NAND memory 30 in which the user data is to be stored is stored as an address conversion table which is an example of management information.

Further, when a read request is received from the host 40, the control unit 22 converts the logical address specified by the read request into the physical address by using the above-described address conversion table, and instructs the memory I/F 25 to read the user data from the physical address.

In addition, at a predetermined timing or when a predetermined event occurs, the control unit 22 controls the memory I/F 25 and instructs the NAND memory 30 to write the management information in the logical block for storing the management information. Further, the control unit 22 controls the memory I/F 25, for example, at the time of starting up the memory system 10, and instructs the NAND memory 30 to read the management information from the logical block for storing the management information.

The data buffer 23 temporarily stores the user data received from the host 40 by the memory controller 20 until the received data is stored in the NAND memory 30. Further, the data buffer 23 temporarily stores the user data read from the NAND memory 30 until the user data is transmitted to the host 40 via the host I/F 21. The data buffer 23 is, for example, a universal memory such as a static random access memory (SRAM) or a dynamic random access memory (DRAM).

The user data transmitted from the host 40 to the memory controller 20 is output to the internal bus 29 via the host I/F 21, and stored in the data buffer 23. The encoder/decoder 24 encodes the data stored in the NAND memory 30 to generate a codeword. The encoder/decoder 24 includes an encoder 26 and a decoder 27. The encoder 26 generates a parity (error correction code) such as a Bose-Chaudhurl-Hocquenghem (BCH) code with respect to the stored data. According to a use purpose of the memory system, the correction capability of the error correction code maybe changed. The decoder 27 detects and corrects an error of read data by using the parity.

Under the control of the control unit 22, the memory I/F 25 instructs the NAND memory 30 to write data. In addition, under the control of the control unit 22, the memory I/F 25 instructs the NAND memory 30 to read data.

Figure 3:
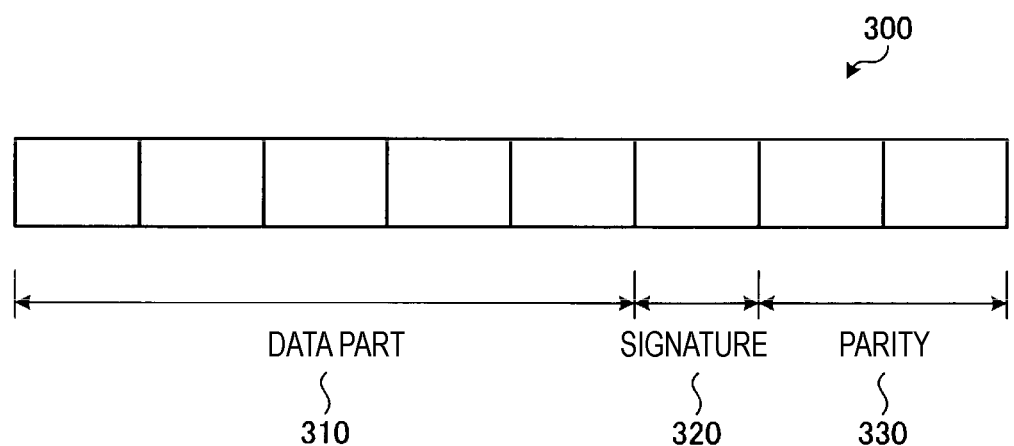
FIG. 3 is a diagram illustrating an example of a frame configuration.

Data writing to the NAND memory 30 is instructed in a unit of a frame including the user data. FIG. 3 is a diagram illustrating an example of a frame configuration. A frame 300 includes a data part 310 including the user data, a signature 320 indicating information on the frame 300, and a parity 330 generated for the data part 310. The signature 320 includes frame delimiter information and previous frame indication information. The frame delimiter information is a fixed bit string indicating a delimiter of data. The previous frame indication information is information indicating a write position of the signature 320 of the frame 300 programmed in the same logical block before a current frame 300. In an example, the signature 320 has a size of one physical page, and the parity 330 has a size of two physical pages. The size of the parity 330 may be changed according to a type of correction algorithm. In addition, the parity 330 may be generated for the data part 310 and the signature 320.

The control unit 22 generates a frame 300 in which the signature 320 and the parity 330 generated by the encoder 26 are attached to the user data stored in the data buffer 23. Further, the control unit 22 divides the frame 300 from the head into the size of the physical page 230. In addition, the control unit 22 controls the memory I/F 25 and instructs the NAND memory 30 to write (program) the divided frames 300 in parallel to each physical block 210. Further, the above-described instruction to write the divided frames 300 is simultaneously issued for the respective physical blocks 210 constituting the logical block 200, but data constituting the frame 300 are not simultaneously written in all physical blocks 210, this depending on the state of the write process in each physical block 210. That is, even in a state in which the data constituting the frame 300 is already written in a predetermined physical block 210, the data constituting the frame 300 may not yet be written or may be in the process of being written in a separate physical block 210.

The memory system 10 may be, for example, a memory card in which the memory controller 20 and the NAND memory 30 are configured as one package or solid state drive (SSD).

In the memory system 10, the management information written to a predetermined physical block in the NAND memory 30 is read at the time of start-up. As described above, in the NAND memory 30, data is written (programmed) in order from a leading physical page of the physical block. Therefore, in the NAND memory 30, at the time of start-up, since the management information is read, a process of searching a final programmed page is performed. Here, the final programmed page is the non-erased page having the address value most distant from the leading page in the logical block. Since in the process, a boundary between a programmed physical page (hereinafter, referred to as a programmed page) and a physical page in an erased state (hereinafter, referred to as an erased page) (this boundary hereinafter also referred to as a program/erase boundary) is searched, hereinafter, the process will be referred to as a boundary search process. In the boundary search process, a function determining whether a specific physical page is in the programmed state or the erased state is used. Therefore, the final programmed page in the logical block is specified.

Unauthorized power shutdown may occur during the write to the physical page. "Unauthorized power shutdown" is an unexpected power shutdown which does not follow a formal instruction for power interrupt from the host 40. As the unauthorized power shutdown, for example, there is an instantaneous disconnection in which the supply of power to the memory system 10 is instantly cut off. When the unauthorized power shutdown occurs, there is a possibility that physical pages in a write completion state, a write intermediate state, and an unwritten state may be arranged out of order in a predetermined logical page. In this case, the final programmed page in the logical block becomes ambiguous.

Therefore, in the embodiment, when the boundary search process is performed, the control unit 22 controls the memory I/F 25 and instructs the NAND memory 30 to perform processes classified into three types including a search process of finding a final page candidate in the logical block, an upward check process from the final page candidate, and a downward check process from the final page candidate. Here, the final page candidate is a candidate of the final programmed page.

In the search process, for example, the final page candidate is acquired by two searches. In the upward check process, it is determined whether the number of programmed pages among a first range number of physical pages existing in the upward direction from the final page candidate is equal to or greater than a first reference value. The first range number may be, for example, the number of physical pages in one logical page. Further, the first reference value may be X+1 pages, where X is a natural number.

Figure 4:
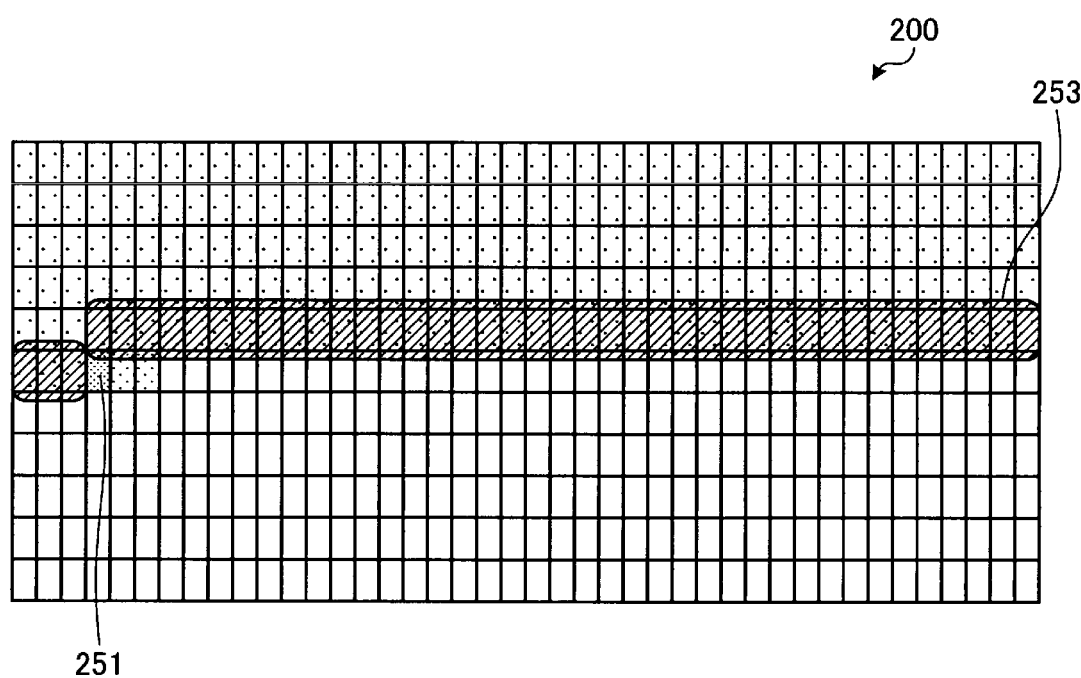
FIG. 4 is a diagram schematically illustrating an outline of an upward check process according to an embodiment.

FIG. 4 is a diagram schematically illustrating an outline of an upward check process according to an embodiment. In the example illustrated in FIG. 4, after a final page candidate 251 is determined, the upward check process is executed on the first range number of physical pages 253 in the upward direction from the final page candidate 251. The first range number is, for example, the number of physical pages for one logical page. In the upward check process, the control unit 22 determines whether the number of programmed pages among the first range number of physical pages 253 is equal to or greater than the first reference value. When it is determined that the number of programmed pages is equal to or greater than the first reference value among the first range number of physical pages 253, the control unit 22 regards the upward direction from the final page candidate 251 as the programmed state. Further, when it is determined that the number of programmed pages among the first range number of physical pages 253 is less than the first reference value, the control unit 22 regards the upward direction from the final page candidate 251 as the erased state, determines that the final page candidate 251 is not the final programmed page, and corrects a range of the next search process.

When it is determined by the upward check process that the number of programmed pages is equal to or greater than the first reference value, the downward check process is executed. In the downward check process, it is determined whether the number of programmed pages among a second range number of physical pages existing in the downward direction from the final page candidate is equal to or less than a second reference value. The second range number may be, for example, the number of physical pages in one logical page. Further, the second reference value may be, for example, X, where X is a natural number.

Figure 5:
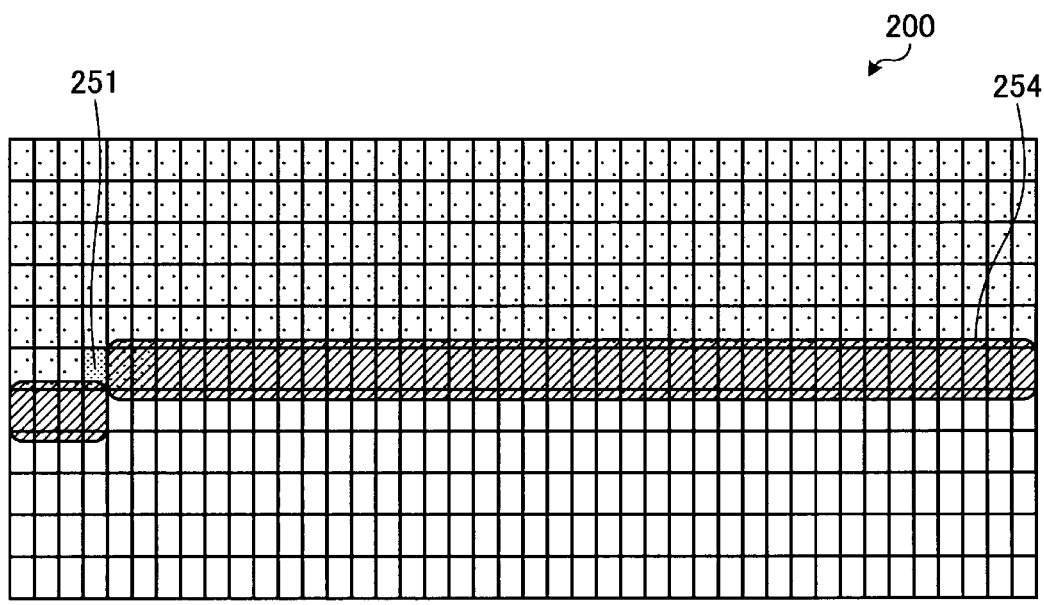
FIG. 5 is a diagram schematically illustrating an outline of a downward check process according to an embodiment.

FIG. 5 is a diagram schematically illustrating an outline of a downward check process according to an embodiment. In the example illustrated in FIG. 5, the downward check process is executed on a second range number of physical pages 254 in the downward direction from the final page candidate 251. The second range number is, for example, the number of physical pages for one logical page. In the downward check process, the control unit 22 determines whether the number of programmed pages among the second range number of physical pages 254 is equal to or less than the second reference value. When it is determined that the number of programmed pages among the second range number of physical pages 254 is equal to or less than the second reference value, the control unit 22 determines that the final programmed page exists in the downward direction from the final page candidate 251. In this case, among the physical pages determined to be in the programmed state in the second range number of physical pages 254, the physical page having the address value most distant from the final page candidate 251 becomes the final programmed page. When it is determined that the number of programmed pages among the second range number of physical pages 254 is greater than the second reference value, the control unit 22 regards the physical pages in the downward direction from the final page candidate 251 as being in the programmed state. That is, the control unit 22 determines that there is no final page in the second range number of physical pages 254, and corrects the range of a next search process. In this way, the control unit 22 specifies the final programmed page in the logical block from results of the upward check process and the downward check process.

In the above-described determination, the number of consecutive programmed pages from the final page candidate is not equal to or greater than the first reference value or equal to or less than the second reference value. This is because it is assumed that because of an unauthorized power shutdown in the middle of the write of the management information as described above, physical pages of a write completion state, a write midway state, and an unwritten state are out of order.

Further, the first reference value of the upward check process and the second reference value of the downward check process can be made equal to or less than the maximum number of physical pages correctable with the parity.

Furthermore, when the number of programmed pages is greater than the maximum number of correctable physical pages in the downward check process, that is, when the correction capability is exceeded, data cannot be read. In this case, there is a possibility that an actual final programmed page exists in the downward direction from the final page candidate. Therefore, in this case, the search range of the search process to be performed next is corrected so that the state will not be turned back from the current final page candidate.

Figure 6:
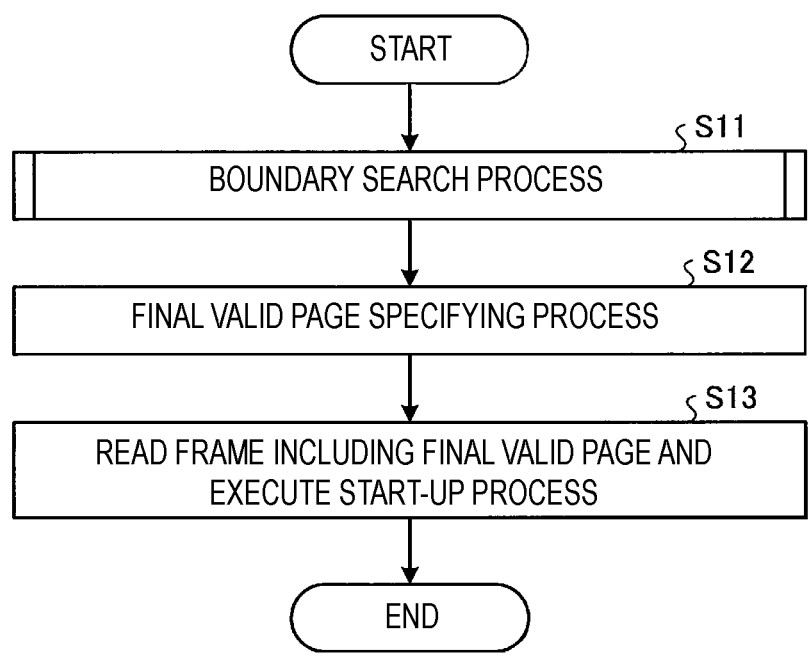
FIG. 6 is a flowchart illustrating an example of a procedure at the time of starting up a memory system according to an embodiment.
Figure 7:
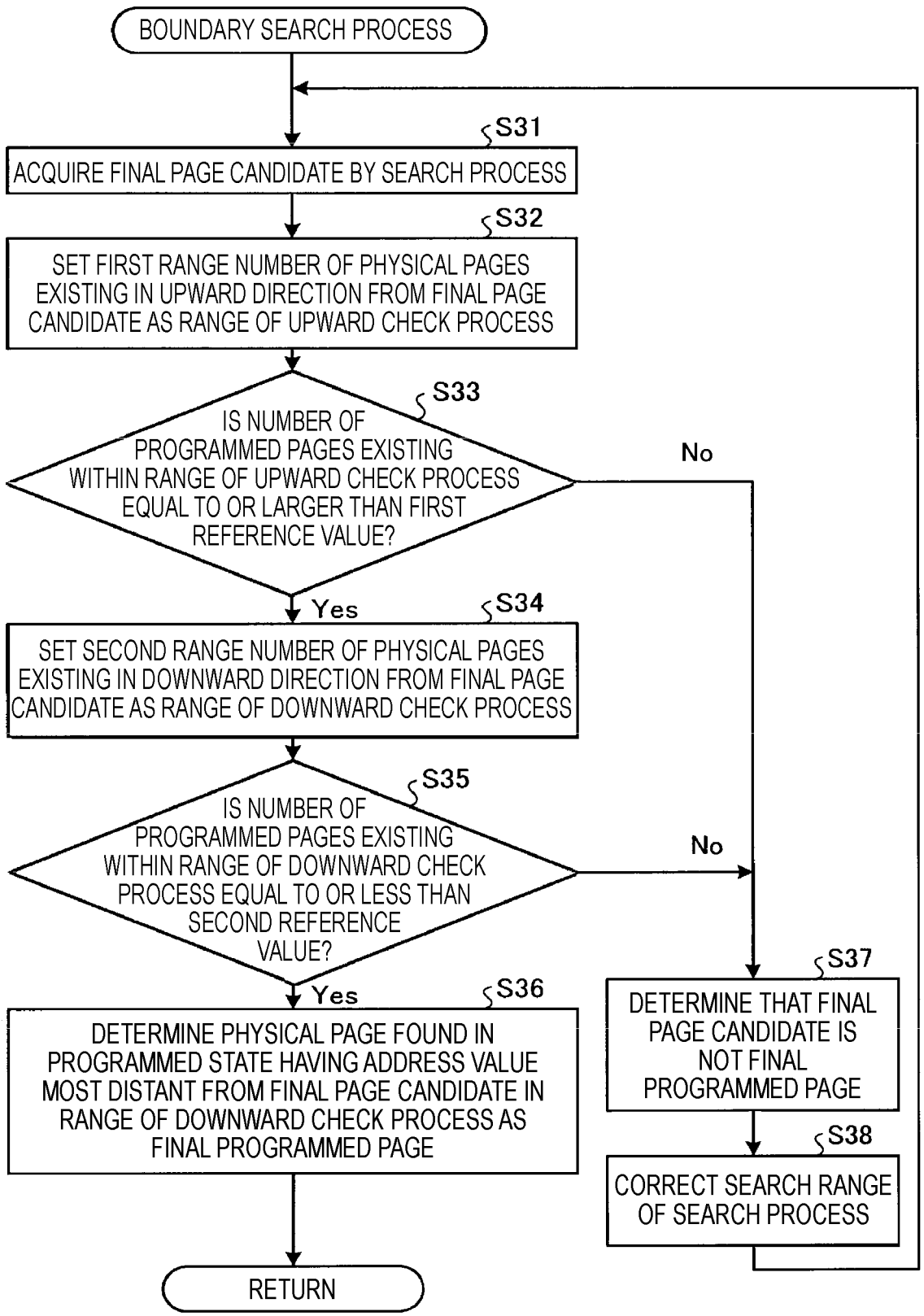
FIG. 7 is a flowchart illustrating an example of a procedure of a boundary search process according to an embodiment.

FIG. 6 is a flowchart illustrating an example of a procedure at the time of starting up a memory system according to an embodiment, and FIG. 7 is a flowchart illustrating an example of a procedure of a boundary search process according to an embodiment. When the memory system 10 is started up, under the control of the control unit 22, the memory I/F 25 causes the NAND memory 30 to execute the boundary search process (step S11). The boundary search process is a process of searching for the program/erase boundary, that is, a process of specifying the final programmed page in the logical block.

When the final programmed page is specified by the boundary search process, the memory I/F 25 causes the NAND memory 30 to execute a final valid page specifying process under the control of the control unit 22 (step S12). In the final valid page specifying process, the control unit 22 assumes that the final programmed page is the physical page having the address value most distant from the leading page of the logical block when it is assumed that the frame is normally written. The control unit 22 acquires a signature from the final programmed page, and reads the data part of the frame having the signature. Then, the control unit 22 performs correction using the parity when the control unit 22 cannot read the data part. When the data part can be read or the data part can be corrected using the parity, the control unit 22 specifies the final programmed page that is specified by the boundary search process, as the final valid page. Further, when the signature cannot be acquired or the data part cannot be corrected even using the parity, after this frame, the control unit 22 performs the same process with respect to a signature of a frame in the logical block having an address value distant the leading page of this frame. The control unit 22 repeats the above-described process until the final valid page is specified. In the final valid page specifying process, the control unit 22 searches the physical page including the signature by a linear search.

Thereafter, the control unit 22 reads a frame including the specified final valid page, and performs the start-up process of the memory system 10 by the memory controller 20 (step S13). Then, the process is ended.

Next, details of the boundary search process of step S11 will be described with reference to the flowchart of FIG. 7. The memory I/F 25 acquires the final page candidate in the logical block from which the data is read, using the two searches (step S31). Subsequently, the memory I/F 25 determines the first range number of physical pages existing in the upward direction from the final page candidate as the range of the upward check process (step S32). The first range number may be, for example, the number of physical pages for one logical page. Thereafter, the memory I/F 25 determines whether the number of programmed pages existing within the range of the upward check process is equal to or greater than the first reference value (step S33). For example, the first reference value is X+1.

When it is determined that the number of programmed pages existing within the range of the upward check process is equal to or greater than the first reference value ("Yes" in step S33), the memory I/F 25 determines the second range number of programmed pages existing in the downward direction from the final page candidate as the range of the downward check process (step S34). The second range number may be, for example, the number of physical pages for one logical page. Thereafter, the memory I/F 25 determines whether the number of programmed pages existing within the range of the downward check process is equal to or less than the second reference value (step S35).

When it is determined that the number of programmed pages existing within the range of the downward check process is equal to or less than the second reference value ("Yes" in step S35), the memory I/F 25 determines that the final programmed page exists within the range of the downward check process. Then, the memory I/F 25 specifies the physical page determined to be in the programmed state and within the range of the downward direction check process that has the address value most distant from the final page candidate, as the final programmed page (step S36). Then, the process returns to the flowchart of FIG. 6.

Meanwhile, when it is determined in step S33 that the number of programmed pages among the first range number of physical pages is less than the first reference value ("No" in step S33), the memory I/F 25 determines the first range as the erased state. That is, the memory I/F 25 determines that the final page candidate is not the final programmed page (step S37), and corrects the search range of the two searches (step S38). Then, the process returns to step S31.

Further, when it is determined in step S35 that the number of programmed pages existing within the range of the downward check process is greater than the second reference value ("No" in step S35), the memory I/F 25 determines the range of the downward check process to be the programmed state. Even in this case, the process proceeds to step S37.

Figure 8A:
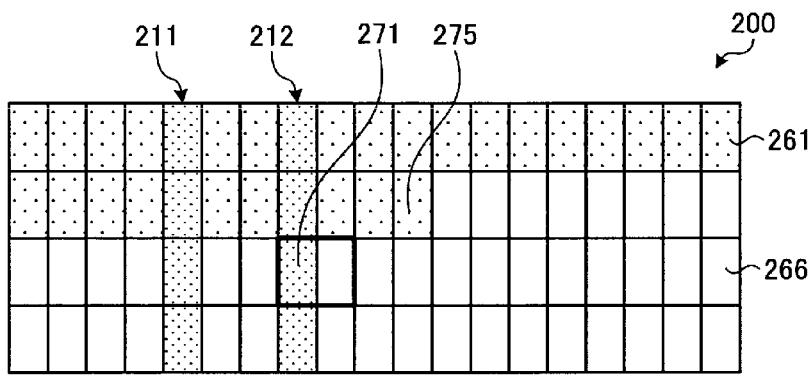
FIGS. 8A to 8C are diagrams illustrating an example of a final programmed page that is determined in a boundary search process according to an embodiment.
Figure 8B:
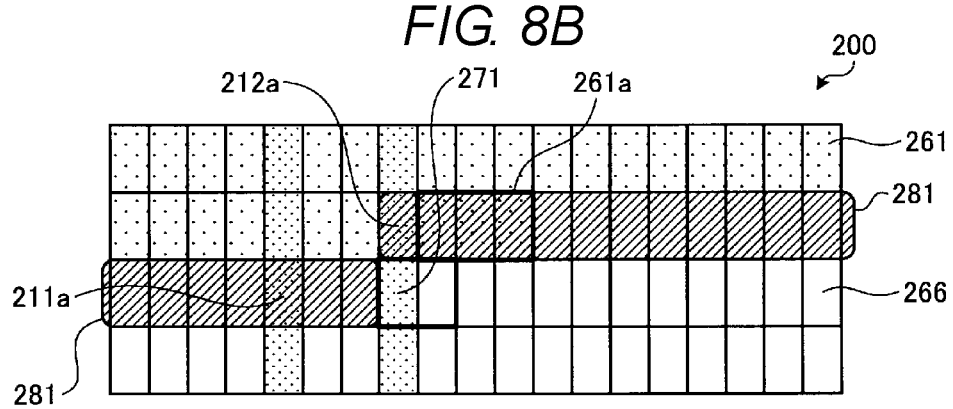
Figure 8C:
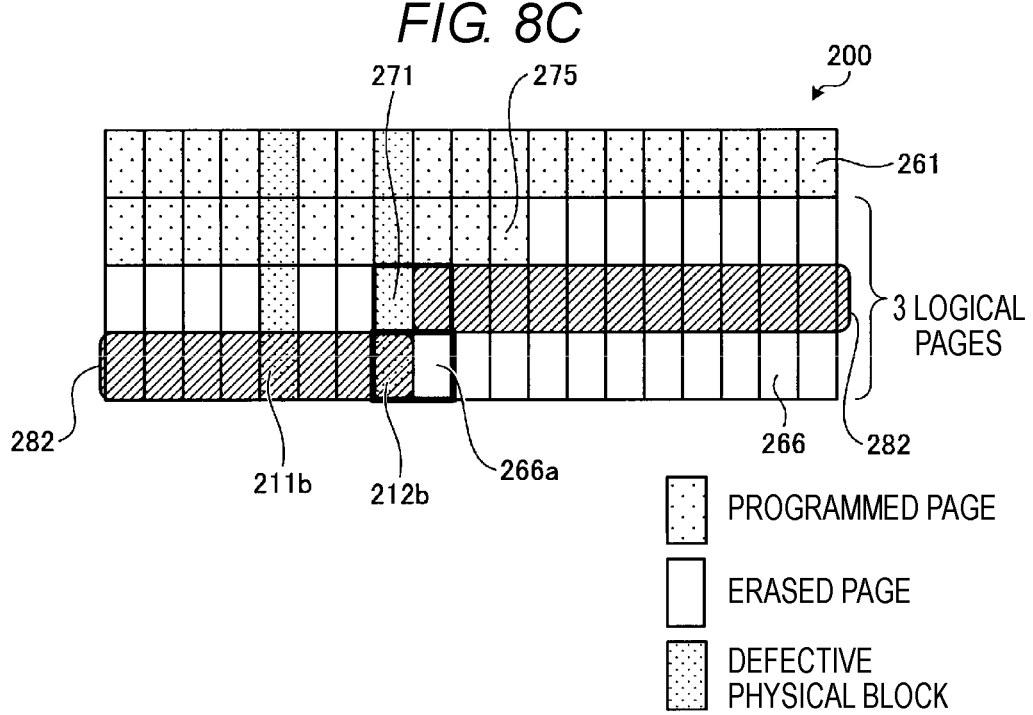

FIGS. 8A to 8C are diagrams illustrating an example of a final program page determined in a boundary search process according to an embodiment. In the example illustrated in FIGS. 8A to 8C, the logical block 200 includes a programmed page 261, an erased page 266, and defective physical blocks 211 and 212. In addition, here, X is set to 2. That is, the first reference value is set to 3, and the second reference value is set to 2. Further, FIGS. 8A to 8C omits illustration of the parity.

In the example illustrated in FIG. 8A, a defective physical page in the defective physical block 212 is acquired as the final page candidate 271 by the search process in step S31 of FIG. 7. Further, a difference between the address value of the final page candidate 271 and the address value of the actual final programmed page 275 is an address value for one logical page.

The upward check process is executed on the final page candidate 271. In the example illustrated in FIG. 8B, a range 281 of the upward check process is, for example, one logical page in the upward direction from the final page candidate 271. In a range 281 of the upward check process, three programmed pages 261a and defective two physical pages 211a and 212b exist. As the result of the upward check process, the number of programmed pages is five and becomes equal to or greater than three which is the first reference value. In this case, the control unit 22 executes the downward check process on the final page candidate 271 again.

In the example illustrated in FIG. 8C, a range 282 of the downward check process is, for example, one logical page in the downward direction from the final page candidate 271. In the range 282 of the downward check process, two defective physical pages 211b and 212b exist. As the result of the downward check process, the number of physical pages which is in the programmed state is two and becomes equal to or less than the second reference value (=2). In this case, the control unit 22 determines that the final programmed page exists in the range 282 of the downward check process. Then, the control unit 22 specifies the physical page determined in the programmed state that has the address value most distant from the final page candidate 271 within the range 282 of the downward check process, that is, the erroneously determined defective physical page 212b, as the final programmed page. That is, the memory I/F 25 specifies that a space between the defective physical page 212b and an adjacent erased page 266a is a program/erase boundary 291.

In this case, as illustrated in FIG. 8C, the specified final programmed page 212b is different from the actual program/ erase boundary 275. However, the actual program/erase boundary 275 exists no more than three logical pages from the logical page containing the specified final programmed page 212b. That is, according to the embodiment, the search range of the linear search in the final valid page specifying process can be narrowed, and the maximum the time required for the start-up process can be reduced.

Further, in the above description, the two searches are used in the boundary search, but instead of the two searches, for example, N searches (N is a natural number of 2 or more) such as eight searches may be used.

As described above, in the embodiment, the upward check process is performed, of determining whether the number of programmed pages among the first range number of physical pages existing in the upward direction from the final page candidate is equal to or greater than the first reference value, after acquiring the final page candidate in the logical page. When the first condition is satisfied in the upward check process, the downward check process is performed, for determining whether the number of programmed pages among the second range number of physical pages existing in the downward direction from the final page candidate is equal to or less than the second reference value. When the second condition is satisfied in the downward check process, the programmed page among the second range number of physical pages having the address value most distant from the final page candidate 251 is set as the final programmed page. In this manner, by providing redundancy for a final check on the final page candidate, even when the final page candidate becomes a defective physical page, it is possible to specify the final programmed page with stable accuracy.

As a result, there is an effect that the final programmed page may be efficiently searched with the logical block including the non-erased page.

In addition, even when a defective physical page is in the logical block, it is possible to determine the final programmed page within the range of three logical pages from the actual final programmed page by the boundary search process. That is, the actual final programmed page exists within a range of three logical pages from the determined final programmed page. As a result, the search range of the linear search in the final valid page specifying process can be narrowed, and the maximum time required for the start-up process can be reduced.

Furthermore, by the boundary search process according to the embodiment, it is possible to search the final programmed page without largely changing the search time in a normal case where the defective physical page is not included.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a nonvolatile memory including a plurality of physical blocks operable to erase units of data, the plurality of physical blocks having a plurality of physical pages operable to read and write units of data; and
    a memory controller that controls access of data to the nonvolatile memory, wherein the memory controller is configured to:
        integrate the plurality of physical blocks to make up a logical block;
        integrate one or more of the plurality of physical pages having a same relative position in the physical blocks among the plurality of physical pages to make up a logical page;
        instruct the nonvolatile memory to write data such that the data is arranged in a predetermined first order with respect to a plurality of logical pages, and such that the data is arranged in a predetermined second order with respect to the plurality of physical pages in the logical page;
        specify, from the nonvolatile memory, a final page candidate that is a candidate of a physical page in which data is last written in the logical block;
        execute an upward check of determining whether a number of programmed physical pages among a first range number of physical pages existing in a reverse order to the second order from the final page candidate is equal to or greater than a first reference value;
        execute a downward check of determining whether the number of programmed physical pages among a second range number of physical pages existing in the same order as the second order from the final page candidate is equal to or less than a second reference value; and
        specify the physical page in which data is last written in the logical block from results of the upward check and the downward check.

2. The memory system according to claim 1, wherein when upward check determines that the number of programmed physical pages is equal to or greater than the first reference value, and the downward check determines that the number of programmed physical pages is equal to or less than the second reference value, the memory controller is configured to specify the programmed physical page among the first range number of physical pages in the order closest to the second order as the physical page to which data is last written.

3. The memory system according to claim 1, wherein when the upward check determines that the number of programmed physical pages is less than the first reference value, the memory controller is configured to correct the search range of the final page candidate and acquires a new final page candidate.

4. The memory system according to claim 1, wherein when the downward check determines that the number of programmed physical pages is greater than the second reference value, the memory controller is configured to correct the search range of the final page candidate to acquire a new final page candidate.

5. The memory system according to claim 1, wherein the memory controller is configured to acquire the final page candidate by N searches, where N is a natural number equal to or greater than two.

6. The memory system according to claim 1, wherein the memory controller is configured to generate a correction code with respect to data written to the logical block, assign the correction code to the data, and write the data to the logical block,
wherein the first reference value and the second reference value are set to a number of physical pages with a correctable range of error correction capability of the correction code.

7. The memory system according to claim 6, wherein the first reference value is three, and the second reference value is two.

8. The memory system according to claim 1, wherein the first range number is the number of physical pages in one logical page, and the second range number is the number of physical pages in one logical page.

9. The memory system according to claim 1, wherein the nonvolatile memory is a NAND type flash memory.

10. A method for controlling a memory system, the method comprising:
integrating a plurality of physical blocks existing in a nonvolatile memory and being an erasing unit of data, to make up a logical block, the plurality of physical blocks having a plurality of physical pages;
integrating physical pages having a same relative position in the physical blocks among the plurality of physical pages in the physical blocks, each of the plurality of physical pages being a reading/writing unit of data, to constitute a logical page;
instructing the nonvolatile memory to write data such that data is arranged in a predetermined first order with respect to a plurality of logical pages, and data is arranged in a predetermined second order with respect to the plurality of physical pages in the logical page;
specifying, from the nonvolatile memory, a final page candidate which is a candidate to be the physical page to which data is last written in the logical block;
executing an upward check of determining whether the number of programmed physical pages among a first range number of physical pages existing in an order from the final page candidate that is the reverse of the second order is equal to or greater than a first reference value;
executing a downward check of determining whether the number of programmed physical pages among a second range number of physical pages existing in the same order as the second order from the final page candidate is equal to or less than a second reference value; and
specifying the physical page to which data is last written in the logical block from results of the upward check and the downward check.

11. A memory controller for controlling access of data to a nonvolatile memory having a plurality of physical blocks having a plurality of physical pages, the memory controller comprising electrical circuits configured to:
integrate the plurality of physical blocks to make up a logical block, and integrate one or more of the plurality of physical pages having a same relative position in the physical blocks among the plurality of physical pages to make up a logical page;
instruct the nonvolatile memory to write data such that the data is arranged in a predetermined first order with respect to a plurality of logical pages, and such that the data is arranged in a predetermined second order with respect to the plurality of physical pages in the logical page;
specify, from the nonvolatile memory, a final page candidate that is a candidate of a physical page in which data is last written in the logical block;
execute an upward check of determining whether a number of programmed physical pages among a first range number of physical pages existing in a reverse order to the second order from the final page candidate is equal to or greater than a first reference value;
execute a downward check of determining whether the number of programmed physical pages among a second range number of physical pages existing in the same order as the second order from the final page candidate is equal to or less than a second reference value; and
specify the physical page in which data is last written in the logical block from results of the upward check process and the downward check process.

12. The memory controller of claim 11, wherein the electrical circuits are further configured to erase one or more of the plurality of physical blocks and program one or more of the plurality of physical pages.

13. The memory controller of claim 11, wherein when upward check determines that the number of programmed physical pages is equal to or greater than the first reference value, and the downward check determines that the number of programmed physical pages is equal to or less than the second reference value, the memory controller is configured to specify the programmed physical page among the first range number of physical pages in the order closest to the second order as the physical page to which data is last written.

14. The memory controller of claim 11, wherein when upward check determines that the number of programmed physical pages is less than the first reference value, the memory controller is configured to correct the search range of the final page candidate and acquire a new final page candidate.

15. The memory controller of claim 11, wherein when downward check determines that the number of programmed physical pages is greater than the second reference value, the memory controller is configured to correct the search range of the final page candidate to acquire a new final page candidate.

16. The memory controller of claim 11, wherein the memory controller is configured to acquire the final page candidate by N searches, wherein N is a natural number equal to or greater than two.

17. The memory controller of claim 11, wherein the memory controller is configured to generate a correction code with respect to the data written to the logical block and assign the correction code to the data and writes the data to the logical block, and wherein the first reference value and the second reference value are set to be a number of physical pages with a correctable range of error correction capability of the correction code.

18. The memory controller of claim 17, wherein the first reference value is three, and the second reference value is two.

19. The memory controller of claim 11, wherein the first range number is the number of physical pages in one logical page, and the second range number is the number of physical pages in one logical page.

20. The memory controller of claim 12, wherein the nonvolatile memory is a NAND type flash memory.

* * * * *